(12) United States Patent
Coldren

(10) Patent No.: US 7,743,164 B2
(45) Date of Patent: Jun. 22, 2010

(54) METHOD AND APPARATUS FOR TRANSMITTING FREQUENCY SHIFT KEY DATA IN A PACKETIZED FORMAT

(75) Inventor: Rex Arthur Coldren, Phoenix, AZ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1474 days.

(21) Appl. No.: 10/778,556

(22) Filed: Feb. 13, 2004

(65) Prior Publication Data

US 2005/0198391 A1 Sep. 8, 2005

(51) Int. Cl.
*G06F 15/16* (2006.01)
(52) U.S. Cl. ........................... 709/236; 709/246
(58) Field of Classification Search ........... 709/230, 709/236, 246; 370/370, 466
See application file for complete search history.

(56) References Cited

U.S. PATENT DOCUMENTS

| 5,646,940 | A * | 7/1997 | Hotto | 370/496 |
|---|---|---|---|---|
| 6,731,649 | B1 * | 5/2004 | Silverman | 370/466 |
| 6,785,301 | B1 * | 8/2004 | Chapman et al. | 370/352 |
| 6,801,499 | B1 * | 10/2004 | Anandakumar et al. | 370/229 |
| 6,804,244 | B1 * | 10/2004 | Anandakumar et al. | 370/395.21 |
| 7,003,093 | B2 * | 2/2006 | Prabhu et al. | 379/390.02 |
| 7,080,248 | B1 * | 7/2006 | Liebert et al. | 713/151 |
| 7,113,503 | B1 * | 9/2006 | Basore et al. | 370/352 |
| 2004/0165527 | A1 * | 8/2004 | Gu et al. | 370/229 |
| 2005/0120208 | A1 * | 6/2005 | Dobson | 713/160 |
| 2005/0180434 | A1 * | 8/2005 | Marcu et al. | 370/401 |
| 2005/0238160 | A1 * | 10/2005 | Sunstrum | 379/220.01 |
| 2006/0187900 | A1 * | 8/2006 | Akbar | 370/352 |

OTHER PUBLICATIONS

C. Perkins, "RTP Payload for Redundant Audion Data", Sep. 1997, Department of Computer Science, University of College London.*
H. Schulzrinne, S. Casner, R. Frederick, and V. Jacobson, "RTP: A Transport Protocol for Real-Time Applications", Request for Comments (Proposed Standard) 1889, Internet Engineering Task Force, Jan. 1996.
C. Perkins, I. Kouvelas, O. Hodson, V. Hardman, M. Handley, J.C. Bolot, A. Vega-Garcia, and S. Fosse-Parisis, "RTP Payload for Redundant Audio Data", Request for Comments (Proposed Standard) 2198, Internet Engineering Tast Force, Sep. 1997.
H. Schulzrinne and S. Petrack, "RTP Payload for DTMF Digits, Telephony Tones and Telephony Signals", Internet Draft ietf-avt-tones-07-txt, Internet Engineering Task Force, Feb. 2000.
LSSGR: Voiceband Data Transmission Interface (FSD 05-01-0100); Issue 2, Dec. 1998; Telcordia Technologies, GR-30-CORE.

* cited by examiner

*Primary Examiner*—Benjamin R Bruckart
*Assistant Examiner*—Gerald Smarth
(74) *Attorney, Agent, or Firm*—Fay Sharpe LLP

(57) ABSTRACT

This invention relates to a method and apparatus for transmitting frequency shift key (FSK) data in packetized format. More particularly, the invention is directed to a method for using a new Real-Time Transport Protocol (RTP) payload type to transport FSK data used for voiceband data transmission outside of the voice RTP stream. This technique allows for data compression and reduces the possibility of packet loss for FSK data carried in-band.

23 Claims, 9 Drawing Sheets

FIG. 6(a)

FSK SIGNALING PACKET #1:

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| 2 | 0 | 0 | 0 | 0 | 0 | 0 | 0 | 0 | 93 | | | | | | 11500 | | | | | | | | | | 0x5234a8 | | | | | | | 12301 |
| 0 | | | 95 | | | | | 0 | | | 12 | | | | | | | 0 | 0 | 1 | 0 | 1 | 0 | 1 | 1 | 0 | 1 | 0 | 1 | 0 | 1 |

FIG. 6(b)

FSK SIGNALING PACKET #2:

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| 2 | 0 | 0 | 0 | 0 | 0 | 0 | 0 | 0 | 93 | | | | | | 11580 | | | | | | | | | | 0x5234a8 | | | | | | | 12302 |
| 1 | | | 95 | | | | | 0 | | | 12 | | | | | 80 | | | | | | | | | | | | 3 | | | |
| 0 | 0 | 1 | 0 | 0 | 1 | 1 | 0 | 0 | 1 | 0 | 1 | 0 | 1 | 0 | 1 | 0 | 1 | 0 | 0 | 1 | 1 | 0 | 1 | 1 | 0 | 1 | 0 | 1 | 0 | 1 | 0 |

FIG. 7(α)

FSK SIGNALING PACKET #76 (LAST WITH PRIMARY FSK DATA BLOCK):

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| 2 | 0 | 0 | 0 | 0 | 0 | 0 | 0 | 0 | 0 | 0 | 93 | | | | | | 17500 | | | | | | 12376 | | | | | | | | |
| 1 | | | | 95 | | | | | | | | 12 | | | | 0x5234a8 | | | | | | | | 160 | | | | | 3 | | |
| 1 | | | | 95 | | | | | | | | | | | | | | | | | | | | 80 | | | | | 3 | | |
| 0 | | | | 95 | | | | | | | | | | | | | | | | | | | | 0 | | | | | 0 | | |
| 1 | 0 | 1 | 0 | 1 | 1 | 0 | 1 | 0 | 1 | 1 | 0 | 1 | 0 | 1 | 0 | 0 | 1 | 0 | 1 | 0 | 1 | 0 | 1 | 0 | 1 | 0 | 1 | 0 | 1 | 0 | 1 |

FIG. 7(b)

FSK SIGNALING PACKET #77 (FIRST WITH NO PRIMARY FSK DATA BLOCK):

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| 2 | 0 | 0 | 0 | 0 | 0 | 0 | 0 | 0 | 93 ||||| 17580 |||||||||||| 12377 |||||||
| 1 | 95 |||| 0 ||| 0x5234a8 |||||||| 160 |||||||| 3 |||||
| 0 | 95 |||| 0 ||||| 80 |||||||||| 0 ||||| 3 |||||
| 1 | 0 | 1 | 0 | 1 | 0 | 1 | 0 | 0 | 0 | 1 | 1 | 0 | 1 | 0 | 1 | 0 | 1 | 0 | 1 | 0 | 1 | 0 | 1 | 0 | 1 | 0 | 1 | 0 | 1 | 0 | 1 |

FSK SIGNALING PACKET #78 (LAST ONE TRANSMITTED): 710

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| 2 | 0 | 0 | 0 | 0 | 0 | 0 | 0 | 0 | 93 | | | | 17660 | | | | 12378 | | | | | | | | | | | | | | |
| 0 | 95 | | | | | | 12 | | | 0x5234a8 | | | | | | | | 80 | | | | | | | | | 3 | | | | |
| 0 | 1 | 0 | 1 | 0 | 1 | 0 | 1 | 1 | 0 | 1 | 0 | 1 | 0 | 1 | 0 | 1 | 0 | 1 | 1 | 0 | 1 | 0 | 1 | 0 | 1 | 0 | 1 | 0 | 1 | 0 | 1 |

706'     706"     706

METHOD AND APPARATUS FOR TRANSMITTING FREQUENCY SHIFT KEY DATA IN A PACKETIZED FORMAT

BACKGROUND OF THE INVENTION

This invention relates to a method and apparatus for transmitting frequency shift key (FSK) data in packetized format. More particularly, the invention is directed to a method for using a new Real-time Transport Protocol (RTP) payload type to transport FSK data used for voiceband data transmission outside of the voice RTP stream. This technique allows for data compression and reduces the possibility of packet loss for FSK data carried in-band.

While the invention is particularly directed to the art of data transmission for frequency shift key (FSK) data, and will be thus described with specific reference thereto, it will be appreciated that the invention may have usefulness in other fields and applications. For example, the invention may be used where it is desirable and practical to packetize any form of data within an RTP payload.

By way of background, general requirements for voiceband data transmission can be found in GR-30-CORE, LSSGR: Voiceband Data Transmission Interface (FSD 05-01-0100), Issue 2 (December 1998), which is incorporated herein by reference. These requirements indicate how to set up and transmit voiceband data using continuous-phase binary frequency-shift-keying (BFSK or, more commonly, FSK). FSK is typically used to deliver caller identification (caller ID) information to analog line customer premises equipment (CPE) during normal ringing (on-hook transmission) and call waiting alerting scenarios (off-hook transmission). It is also used to deliver visual message waiting indication during suppressed ringing (on-hook transmission) scenarios. While these applications are not necessarily all-inclusive, they are a representative sampling of the most commonly used features implementing FSK data.

The FSK transmission rate is 1200 baud. A one (1) bit is represented by a 1200 Hz tone. A zero (0) bit is represented by a 2200 Hz tone.

In general, FSK voiceband data transmission is framed loosely by other voiceband signaling events. For example, caller ID delivery during normal ringing places the FSK transmission a minimum of 500 milliseconds into the silent interval between the first and second cycles of ringing. FSK transmission must complete a minimum of 300 milliseconds prior to the beginning of the second ringing on cycle. For caller ID delivery during call waiting alerting, FSK transmission must start between 50 and 500 milliseconds after completion of the CPE alerting signal (CAS) and the CAS acknowledgement sequence of voiceband tones.

For on-hook transmission, there is a preamble sequence of 300 bits "010101 . . . " followed by 180 mark bits (ones) and then the data. For off-hook FSK transmission there is an initial marker of 80 mark bits (ones) and then the data. There is no preamble sequence for off-hook transmissions.

GR-30-CORE imposes three generalized message formats for the data: Single Data Message Format (SDMF), Multiple Data Message Format (MDMF), and Generic Data Message Format (GDMF). For SDMF and MDMF, each byte of data is preceded by a space bit (zero) and followed by a zero to 10 mark bits (ones). Since there is typically only one mark bit per byte of data there are normally 10 bits per byte of transmitted data. Then there is an eight-bit checksum, which is followed by zero to 10 mark bits. For GDMF there is no structure or framing (i.e., space and mark bits) to the data and there is no checksum, but there are zero to 10 mark bits at the end of the data.

As such, there is variability to the FSK transmission itself. The transmission, thus, may have different states. In this regard, the FSK transmission may have a preamble only for on-hook transmission, different marker lengths, multiple message data formats, a variable number of mark bits between data bytes and, after the data for SDMF and MDMF, no checksum for GDMF. Additionally, FSK transmissions are somewhat delay sensitive in that they are framed by other signaling events.

As shown in FIG. 1, a network 10 includes a public-switched telephone network (PSTN) as having a circuit switch 14. Also shown is a digital loop carrier (DLC) 16 connected to the PSTN 12 and a residence or user site 18. As shown, the residence 18 includes a caller ID box 20 and a phone 22.

In this system, FSK data is typically transmitted in-line to the residence 18 from the PSTN 12 through the DLC 16 using conventional techniques. These conventional techniques result in the difficulties noted above, e.g., state difficulties and transmission delays. Moreover, the call including FSK data cannot be routed through an IP network before being transmitted to the residence because the FSK data would be lost as a result of compression techniques typically implemented in such networks, or because of the potential for packet loss in these networks.

The present invention contemplates a new and improved data transmission technique that resolves the above-referenced difficulties and others.

SUMMARY OF THE INVENTION

A method and apparatus for handling frequency shift key data to be passed through an Internet Protocol (IP) network are provided.

In one aspect of the invention, the method comprises identifying the FSK data, determining that the FSK data is to be transmitted through an IP network, encoding the FSK data as a binary representation, packetizing the encoded FSK data within a Real-time Transport Protocol (RTP) data packet and transmitting the packetized FSK data.

In another aspect of the invention, the system comprises a means for accomplishing the above method.

In another aspect of the invention, a packet format comprises an RTP header and an RTP payload, wherein the RTP payload comprises FSK data encoded as a binary representation.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIGS. 6(a)-6(c) illustrate example data packets according to the present invention; and, FIGS. 7(a)-7(c) illustrate example data packets according to the present invention.

DETAILED DESCRIPTION OF THE PREFERRED EMBODIMENTS

Figure 1:
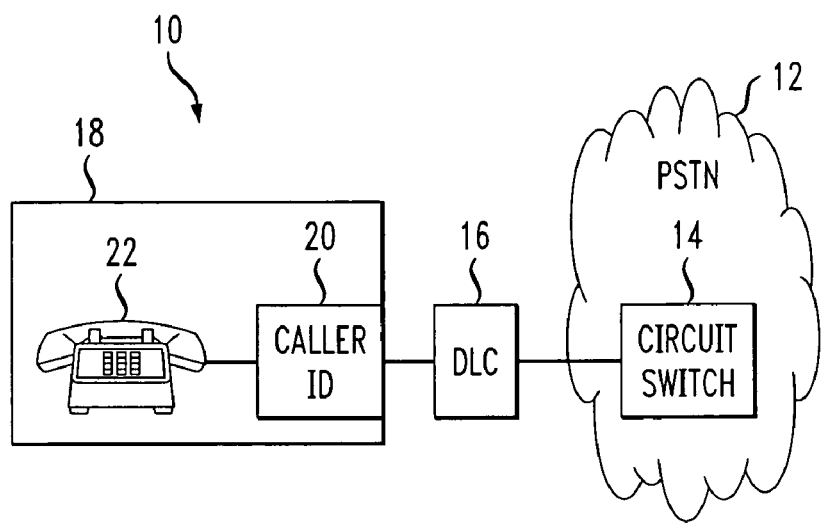
FIG. 1 illustrates a prior art network.
Figure 2:
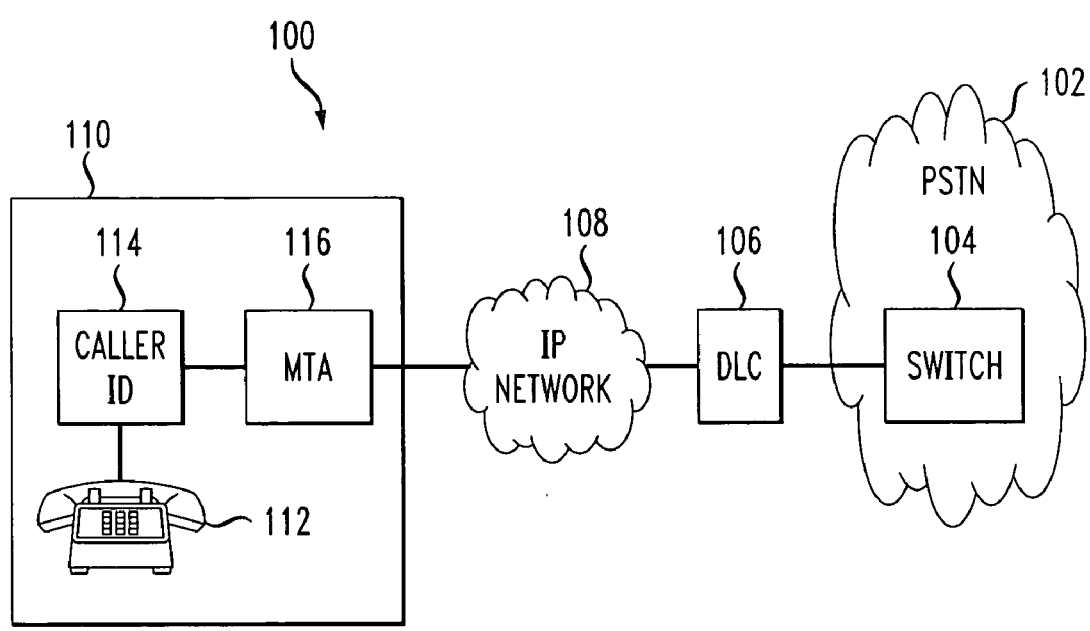
FIG. 2 illustrates a network into which the present invention is implemented.

Referring now to the drawings wherein the showings are for purposes of illustrating the preferred embodiments of the invention only and not for purposes of limiting same, FIG. 2 provides a view of an exemplary system into which the present invention may be incorporated. As shown, network 100 includes a public-switched telephone network (PSTN) 102 having a switching element 104 included therein. A digital loop carrier (DLC) 106 is in communication with the public-switched telephone network (PSTN) 102 as well as an Internet Protocol (IP) network 108. As shown, a residence or user site 110 includes a conventional phone 112 connected to a variety of other devices. These other devices may include a caller ID box 114 and a multimedia terminal adapter (MTA) 116.

Selected elements shown in FIG. 2 take forms that are conventional in the art and illustrate merely one form of a network, e.g., a voice-over-IP (VOIP) application, to which the present invention may be applied. In this exemplary network, for example, the switching element may take the form of a circuit-switched device such as the 5-ESS switch, manufactured by Lucent Technologies, or any other circuit based switching device known to those skilled in the art.

However, to implement and achieve the objectives of the present invention, other elements of the network are preferably modified. For example, the digital loop carrier (DLC) 106 is preferably modified to implement selected algorithms and/or routines and to packetize FSK data, as described herein. In addition, the multimedia terminal adapter (MTA) 116—which typically takes the form of a cable modem, DSL modem or the like, but which also may be a standalone device resident on the home or business Local Area Network (LAN)—is preferably adapted to recognize the packetized data generated by the digital loop carrier (DLC) 106.

In accordance with the present invention, FSK data is encoded, packetized as an RTP payload within an RTP data packet and transmitted through the network by the DLC 106, as opposed to simply being transmitted in-band (or in-line) with the corresponding voice stream, as is conventional. According to the present invention, the FSK tones are stripped from the voice stream and sent out-of-band in a separate RTP stream multiplexed with the voice stream.

The packetization rate and maximum packet sizes used to transport FSK data may vary. Since FSK transmissions are relatively slow (1200 baud) and typically last hundreds of milliseconds, higher packetization rates would only be needed to more closely synchronize with the corresponding voice stream and with the signaling events which frame the FSK transmission. It is preferred that the FSK data packets be transmitted at or close to the packetization rate of the corresponding voice stream.

Maximum packet sizes depend upon available bandwidth. In some applications, it may be necessary to replace voice packets with FSK data packets for the duration of the FSK transmission. In such applications, the maximum packet size allowed for voice packets would be the same size allowed for FSK data packets.

Figure 3:
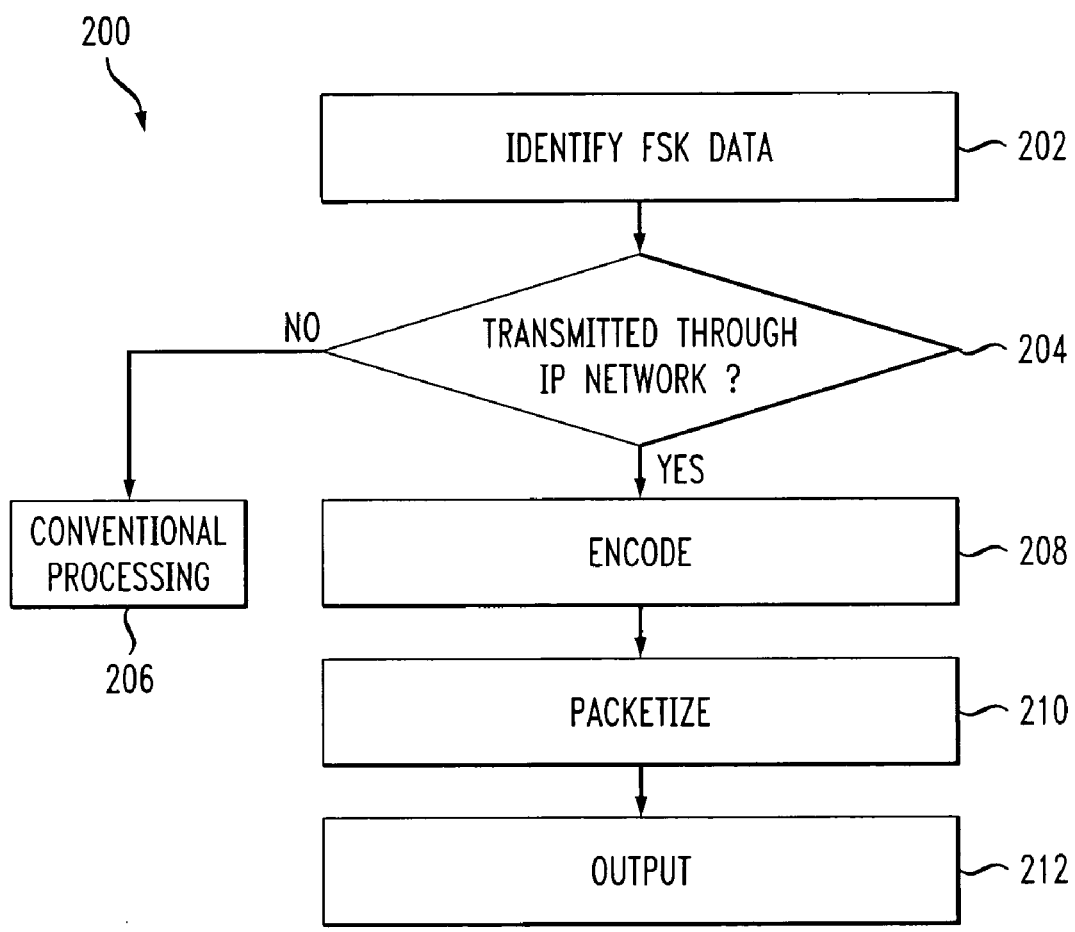
FIG. 3 illustrates a method according to the present invention.

In operation, the digital loop carrier (DLC) 106 functions in accord with the present invention to implement the formation of data packets according to the method illustrated in FIG. 3. It should be appreciated that the method of the present invention may be implemented using a variety of hardware configurations and/or software techniques, preferably within the digital loop carrier 106. Although it is to be understood that the MTA 116 may also perform suitable routines to recognize and process the packetized FSK data.

As shown in FIG. 3, the digital loop carrier (DLC) 106 first identifies FSK data (step 202). Next, a determination is made as to whether the FSK data is to be transmitted through an IP network (step 204). If not, the FSK data is processed as is conventional (step 206). If the FSK data is to be transmitted through an IP network, the FSK data is encoded as a binary representation (step 208). The FSK data is then packetized within a Real-Time Transport Protocol (RTP) data packet, e.g., within a Real-Time Transport Protocol RTP payload (step 210). The packet is then transmitted out of the digital loop carrier (DLC) 106 to the IP network for ultimate transmission to a residence or site such as that shown at 110 of FIG. 2 (step 212).

Of course, the MTA 116 disposed within the residence is operative to recognize (e.g., recognize the payload type) and suitably process the data received (e.g., generate FSK tones at the appropriate times, such as described above). In this regard, suitable software routines are implemented in the MTA 116 to accomplish these objectives. This, of course, allows for the phone at the user site to function with caller ID, call waiting, visual message waiting indicating and other functions as are well known in the art as using FSK data.

Figure 4:
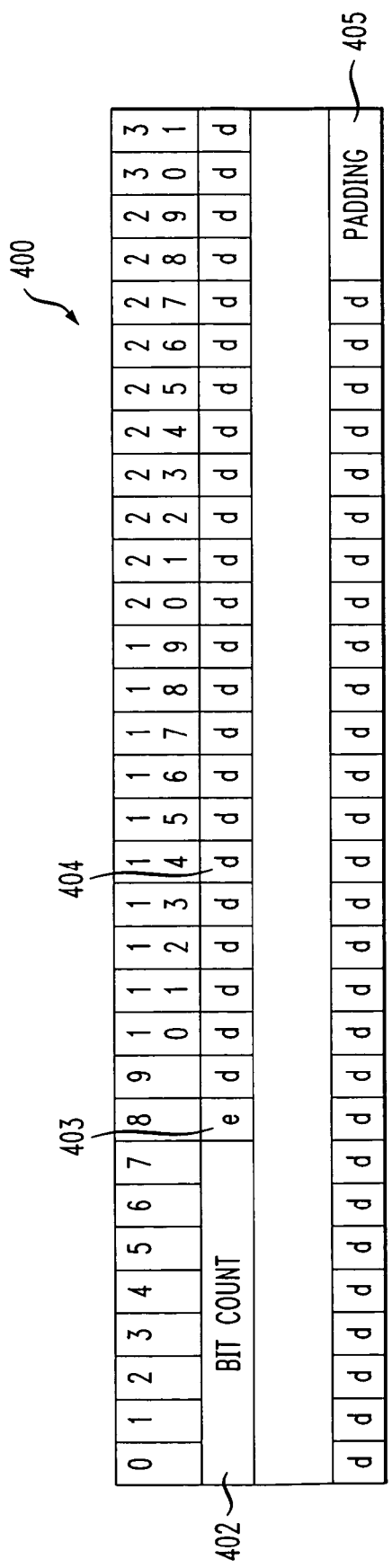
FIG. 4 illustrates a payload format according to the present invention.

Referring now to FIG. 4, a format 400 of an RTP payload according to the present invention to be used for transporting FSK data is illustrated.

The format 400 includes a 32-bit data stream (indicated by reference designations 0 through 31) including a bit count 402 and an end of data bit "e" 403. The bit count 402 indicates the number of data bits contained in the payload block while the end of data bit "e" 403 typically takes on two values. These values include a "1"—which indicates the end of the FSK data being reported—or a "0"—which indicates that the data stream will continue. The data positions having a "d" included therein, shown more particularly and as an example at 404, represent individual bits of the FSK binary data stream. It should be understood that the first bits illustrated in the sequence are the first bits that are actually sent. The payload format 400 also includes padding portion 405, which generally comprises zero bits to fill the payload block and round to an even byte boundary. It should be appreciated that the padding portion 405 is not included in the bit count.

Note that the FSK binary data stream will be passed in the data payload as a packetized bit stream. This includes preamble bits, marker bits, data (with space and marker bits), and checksums, where applicable. This approach removes the need for gateways to analyze the FSK stream.

It should be understood that the RTP payload taking the form of format 400 is included for transmission within an RTP data packet. The RTP packet format that houses the FSK data format or envelope 400 preferably follows the requirements of H. Schulzrinne, S. Casner, R. Frederick, and V. Jacobson, "RTP: a transport protocol for real-time applications," Request for Comments (Proposed Standard) 1889, Internet Engineering Task Force (January 1996), and preferably complements the requirements of H. Schulzrinne and S. Petrack, "RTP Payload for DTMF Digits, Telephony Tones and Telephony Signals", Internet Draft ietf-avt-tones-07-txt, Internet Engineering Task Force (February 2000) (designated as a "work in progress"). Both of these documents are incorporated herein by reference.

Additionally, redundant encoding mechanisms of C. Perkins, I. Kouvelas, O. Hodson, V. Hardman, M. Handley, J. C. Bolot, A. Vega-Garcia, and S. Fosse-Parisis, "RTP payload for redundant audio data," Request for Comments (Proposed Standard) 2198, Internet Engineering Task Force (September 1997) are preferred. This document is likewise incorporated herein by reference.

The redundancy mechanism provides a structure where multiple RTP payload blocks (taking on a format consistent with format 400) can be included in a single RTP packet. A packet can contain one primary data block, representing the payload most recently captured, and zero or more redundant data blocks, representing previously captured data blocks. It should be understood that the previously captured data blocks were each, at one time, primary data blocks.

Figure 5:
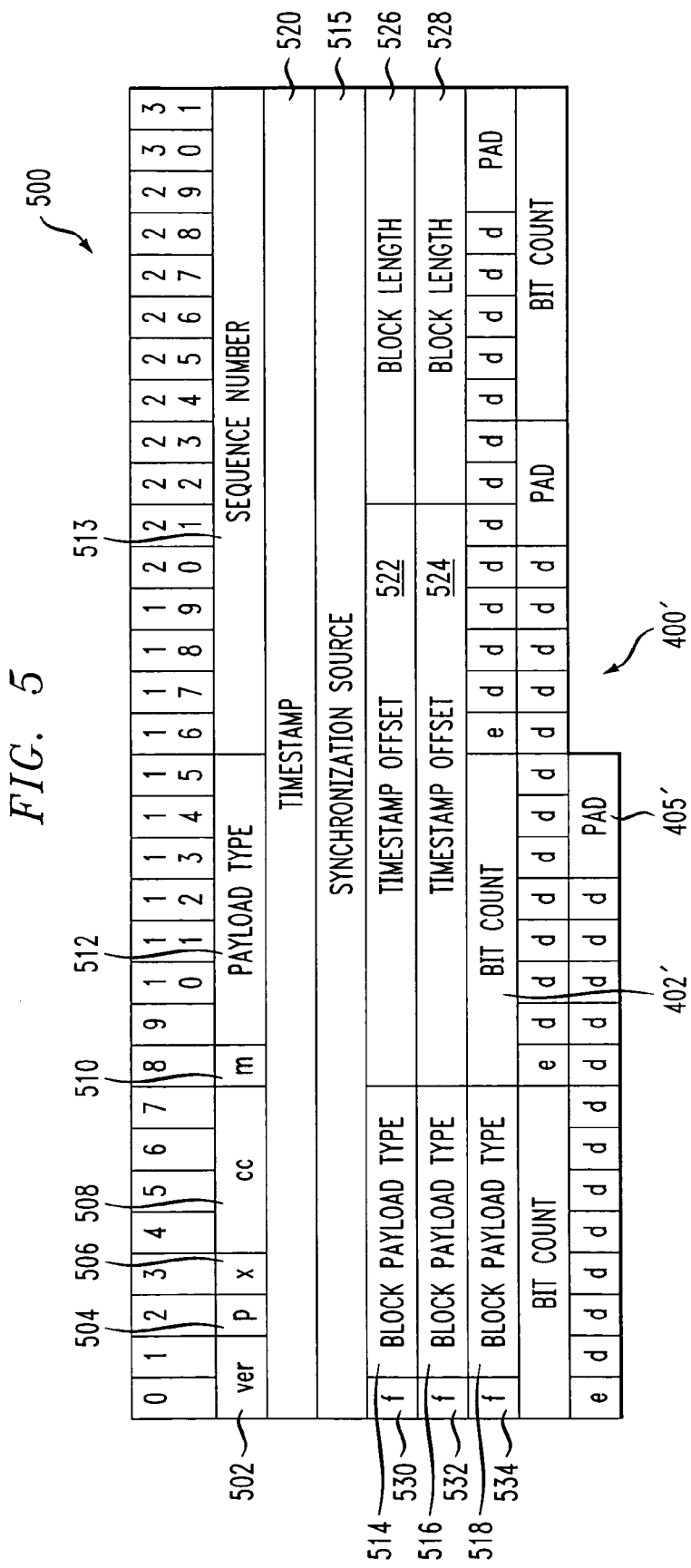
FIG. 5 illustrates a data packet according to the present invention and incorporating the payload format of FIG. 4.

More specifically, an RTP packet format 500 is illustrated in FIG. 5. As shown, the format 500 is also a 32-bit data stream including a variety of known informational bits such as version bits (ver) 502, padding bit (p) 504, extension bit (x) 506, CSRC (contributing source) count bits (cc) 508, and marker bit (m) 510.

An RTP payload type 512 indicates the redundancy scheme of, for example, C. Perkins, I. Kouvelas, O. Hodson, V. Hardman, M. Handley, J. C. Bolot, A. Vega-Garcia, and S. Fosse-Parisis, "RTP payload for redundant audio data," Request for Comments (Proposed Standard) 2198, Internet Engineering Task Force (September 1997), while the block payload type 514, 516, and 518 indicates the FSK data payload. Both of these payload types are dynamically assigned values, such as 96 and 97. The mechanism for this assignment is well known to those skilled in the field. Also shown are a sequence number 513 and a synchronization source 515.

The timestamp 520 represents the measurement point for the first data bit of the primary block payload in the packet. In the redundant block headers, the timestamp offsets 522 and 524 indicate the timestamp units to subtract from the RTP header timestamp 520 to obtain the timestamp of the RTP packet that contained the respective redundant block as its primary block. The block lengths 526 and 528 indicate the number of bytes, excluding the block header that is in the FSK data payload block. Note that the timestamp offsets 522 and 524 and block length fields 526 and 528 are not used for the primary encoding since the timestamp offsets 522 and 524 would always be zero and the block length can be determined from the overall packet length. The "f" bits 530, 532, 534 in the block header indicate whether the subsequent block is the final block in this packet—"0" indicates that it is.

Of course, the payload takes substantially the same form as illustrated at FIG. 4. However, the payload 400' (which begins at the first occurrence of a bit count 402' and ends at the last shown pad 405') illustrated in FIG. 5 illustrates redundancy. In this regard, the packet format 500 illustrates redundant payloads as described above.

When using the redundancy mechanism, each data block of an FSK transmission should be sent a minimum of three times, once as the primary data block and two (or more) times as a redundant data block. It is preferred that there normally be two (or more) redundant FSK data blocks along with the primary FSK data block in each FSK data packet. This will provide protection against the loss of up to three (or more) consecutive packets.

Figure 6C:
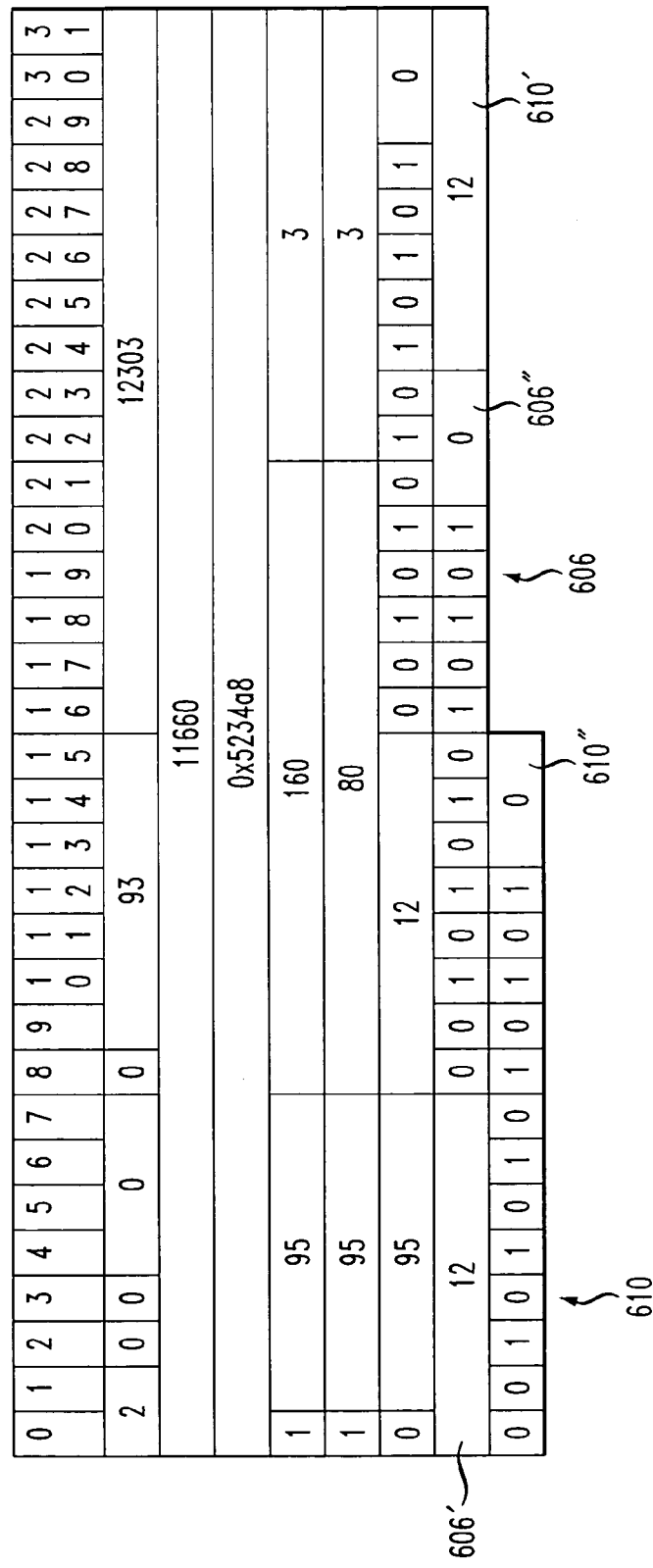

With reference now to FIG. 6(a), in the first packet 600 of an FSK transmission, there will only be a single primary data block 602 (beginning with bit count 602' and ending with pad 602"). FSK data packets will be transmitted with incrementally increasing numbers of FSK data blocks until a threshold is reached where the same number of FSK data blocks are included in each message, as shown in FIGS. 6(b), 6(c). In this regard, a second data packet 604 illustrates a primary data packet 606 (beginning with bit count 606' and ending with pad 606") as well as redundant data packet 602. It should be appreciated that redundant data packet 602 is the same data previously identified in FIG. 6(a) as primary data block 602. Likewise, FIG. 6(c) illustrates a third data packet 608 including primary data block 610 (beginning with bit count 610' and ending with pad 610"), redundant data block 606 (beginning with bit count 606' and ending with pad 606") and another redundant data block 602 (beginning with 606' and ending with pad 602"). As will be appreciated, redundant data blocks 602 and 606 previously served as primary data blocks, as illustrated in FIGS. 6(a) and 6(b).

At the end of the FSK transmission, the last primary data block must be sent as a redundant data block in at least two subsequent packets, as shown in FIGS. 7(a)-(c). In this regard, FIG. 7(a) illustrates a third last data packet 700 including therein primary data block 706 (beginning with bit count 706' and ending with pad 706") and redundant data blocks 704 and 702 (beginning with bit counts 704', 702' and ending with pads 704", 702", respectively). Similarly, FIG. 7(b) illustrates a second last data packet 708 having included therein-redundant data block 704 (beginning with bit count 704' and ending with pad 704") and redundant data block 706 (beginning with bit count 706' and ending with pad 706"). It should be appreciated that no primary data block is illustrated in FIG. 7(b). In addition, FIG. 7(c) illustrates a last data packet 710 (the last one transmitted) including data block 706 (beginning with bit count 706' and ending with pad 706"). As noted above, the last primary data block 706 (FIG. 7(a)) is transmitted in at least two subsequent packets as a redundant data block.

The described example illustrates an FSK on-hook transmission. Note that an FSK transmission contains a variable number of FSK data packets. The number sent will depend upon the length of the transmission, the packetization rate, and the use of the redundancy mechanism.

Moreover, it is worthy of note that in this example, the redundancy mechanism of C. Perkins, I. Kouvelas, O. Hodson, V. Hardman, M. Handley, J. C. Bolot, A. Vega-Garcia, and S. Fosse-Parisis, "RTP payload for redundant audio data," Request for Comments (Proposed Standard) 2198, Internet Engineering Task Force (September 1997) is used with two redundant data blocks included in all but the first two and last two packets in the FSK transmission.

It should also be appreciated that this illustrated sample uses timestamp units that are 8000 hz (i.e., one tick indicates 125 microseconds; this gives 80 ticks per 10 ms packet). Encoding is typically accomplished at a 10 ms packetization rate. Thus, at 1200 baud and a 10 ms packetization rate, 12 bits will be included in each data block of the packet.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

I claim:

1. A method for handling frequency shift key (FSK) data of a voiceband data communication to be passed through an Internet Protocol (IP) network, the method comprising:
identifying the FSK data;
determining that the FSK data is to be transmitted through the IP network separate from a voice stream for the voiceband data communication;
encoding the FSK data as a binary representation;
packetizing the encoded FSK data within Real-Time Transport Protocol (RTP) data packets, each RTP data packet including a header portion with a payload type identifying a redundancy scheme and a payload portion with at least one RTP payload, each RTP payload comprising a bit count, an end of data bit, an FSK data block, and a pad, the RTP data packet includes a first data packet with a first primary FSK data block, a second data packet with a second primary FSK data block and a first redundant FSK data block, a third data packet with a third primary FSK data block and the first redundant FSK data block and a second redundant FSK data block; and,
transmitting the packetized FSK data in the RTP data packets out-of-band from transmission of voice packets associated with the voice stream, wherein the RTP data packets are multiplexed with the voice packets.

2. A system for handling frequency shift key (FSK) data of a voiceband data communication to pass through an Internet Protocol (IP) network, the system comprising:
means for identifying the FSK data;
means for determining that the FSK data is to be transmitted through the IP network separate from a voice stream for the voiceband data communication;
means for encoding the FSK data as a binary representation;
means for packetizing the encoded FSK data within Real-Time Transport Protocol (RTP) data packets, each RTP data packet including a header portion with a payload type identifying a redundancy scheme and a payload portion with at least one RTP payload, each RTP payload comprising a bit count, an end of data bit, an FSK data block, and a pad, the RTP data packet includes a first data packet with a first primary FSK data block, a second data packet with a second primary FSK data block and a first redundant FSK data block, a third data packet with a third primary FSK data block and the first redundant FSK data block and a second redundant FSK data block; and,
means for transmitting the packetized FSK data in the RTP data packets out-of band from transmission of voice packets associated with the voice stream, wherein the RTP data packets are multiplexed with the voice packets.

3. A data format for a voiceband data communication including a voice stream and frequency shift key (FSK) data, comprising:
a Real-Time Transport Protocol (RTP) header portion with a payload type identifying a redundancy scheme; and,
a Real-Time Transport Protocol (RTP) payload portion with at least one RTP payload, each RTP payload comprising a bit count, an end of data bit, an FSK data block, and a pad, wherein each FSK data block comprises frequency shift key (FSK) data separated from the voice stream for the voiceband data communication;
wherein the RTP header and RTP payload portions form an RTP data packet for transmission out-of-band from voice packets associated with the voice stream in a multiplexed fashion in relation to transmission of the voice packets, the RTP data packet includes a first data packet with a first primary FSK data block, a second data packet with a second primary FSK data block and a first redundant FSK data block, a third data packet with a third primary FSK data block and the first redundant FSK data block and a second redundant FSK data block.

4. the method as set forth in claim 1, further comprising: synchronizing the packetized FSK data with at least one of the voice stream and signaling events associated with the voiceband data communication that frame the FSK data.

5. The method as set forth in claim 1, further comprising: selectively replacing voice packets with RTP data packets based at least in part on available bandwidth.

6. The method as set forth in claim 1 wherein the packetizing is accomplished at about a 10 millisecond packetization rate and the transmitting is accomplished at about a 1200 baud rate.

7. An apparatus, comprising:
a digital loop carrier (DLC) receiving a voiceband data communication including a voice stream and frequency shift key (FSK) data; and
a multimedia terminal adapter (MTA) in operative communication with the DLC via an internet protocol network;
wherein the DLC transmits the voiceband data communication to the MTA by separating the FSK data from the voice stream, encoding the FSK data as a binary representation, packetizing the encoded FSK data using a real-time transport protocol (RTP) to form RTP data packets, and transmitting the RTP data packets out-of-band from transmission of voice packets associated with the voice stream, the RTP data packets being multiplexed with the voice packets;
wherein each RTP data packet includes a header portion with a payload type identifying a redundancy scheme and a payload portion with at least one RTP payload, each RTP payload comprising a bit count, an end of data bit, an FSK data block, and a pad, each FSK data block including at least a portion of the FSK data from the voiceband data communication, the RTP data packet includes a first data packet with a first primary FSK data block, a second data packet with a second primary FSK data block and a first redundant FSK data block, a third data packet with a third primary FSK data block and the first redundant FSK data block and a second redundant FSK data block.

8. The method as set forth in claim 1 wherein the RTP data packets include a fourth data packet with the second redundant FSK data block and a third redundant FSK data block, and a fifth data packet with the third redundant FSK data block, wherein the first redundant FSK data block is the same as the first primary FSK data block, the second redundant FSK data block is the same as the second primary FSK data block, and the third redundant FSK data block is the same as the third primary FSK data block.

9. The method as set forth in claim 1 wherein the first data packet includes a first redundant FSK data block.

10. The method as set forth in claim 9 wherein the first data packet includes a second redundant FSK data block.

11. The method as set forth in claim 1 wherein the first redundant FSK data block is the same as the first primary FSK data block.

12. The method as set forth in claim 11 wherein the second redundant FSK data block is the same as the second primary FSK data block.

13. The method as set forth in claim 12 wherein the RTP data packets include a fourth data packet with the second redundant FSK data block, and a third redundant FSK data block, wherein the third redundant FSK data block is the same as the third primary FSK data block.

14. The method as set forth in claim 13 wherein the RTP data packets include a fifth data packet with the third redundant FSK data block.

15. The method as set forth in claim 1 wherein the bit count indicates a number of data bits in the FSK data block of the corresponding RTP payload.

16. The method as set forth in claim 1 wherein the end of data bit indicates whether or not the FSK data block of the corresponding RTP payload is the end of the encoded FSK data.

17. The method as set forth in claim 1 wherein the padding includes enough data bits to fill the corresponding FSK data block to an even byte boundary.

18. The apparatus as set forth in claim 7 wherein the RTP data packets include a first data packet with a first primary a fourth data packet with the second redundant FSK data block and a third redundant FSK data block, and a fifth data packet with the third redundant FSK data block, wherein the first redundant FSK data block is the same as the first primary FSK data block, the second redundant FSK data block is the same as the second primary FSK data block, and the third redundant FSK data block is the same as the third primary FSK data block.

19. The apparatus as set forth in claim 7 wherein the first data packet includes a first redundant FSK data block.

20. The apparatus as set forth in claim 7 wherein the first redundant FSK data block is the same as the first primary FSK data block.

21. The apparatus as set forth in claim 7 wherein the bit count indicates a number of data bits in the FSK data block of the corresponding RTP payload.

22. The apparatus as set forth in claim 7 wherein the end of data bit indicates whether or not the FSK data block of the corresponding RTP payload is the end of the encoded FSK data.

23. The apparatus as set forth in claim 7 wherein the padding includes enough data bits to fill the corresponding FSK data block to an even byte boundary.

* * * * *